March 3, 1970  F. DAMBRINE  3,498,595
PREHEATING APPARATUS USEFUL IN THE MANUFACTURE
OF CEMENT AND THE LIKE
Filed April 11, 1968  2 Sheets-Sheet 1

INVENTOR.
FRANCIS DAMBRINE
BY Kurt Kelman
AGENT

March 3, 1970     F. DAMBRINE     3,498,595
PREHEATING APPARATUS USEFUL IN THE MANUFACTURE
OF CEMENT AND THE LIKE
Filed April 11, 1968     2 Sheets-Sheet 2

INVENTOR.
FRANCIS DAMBRINE
BY Kurt Kelman
AGENT

United States Patent Office 3,498,595
Patented Mar. 3, 1970

3,498,595
PREHEATING APPARATUS USEFUL IN THE
MANUFACTURE OF CEMENT AND THE LIKE
Francis Dambrine, Marcq-en-Baroeul, France, assignor to Societe Fives Lille-Cail, Paris, France
Filed Apr. 11, 1968, Ser. No. 720,576
Claims priority, application France, Apr. 11, 1967, 102,193
Int. Cl. F27b 9/12
U.S. Cl. 263—32     5 Claims

ABSTRACT OF THE DISCLOSURE

In an installation for the heat treatment of finely divided material, wherein the material is passed through preheating apparatus before entering a furnace, a heat exchange tower is arranged ahead of the preheating apparatus, and hot exhaust gases coming from the furnace are delivered countercurrently to the heat exchange tower to heat the material intensely before it enters the preheating apparatus, and are exhausted from the heat exchange tower at a relatively low temperature.

BACKGROUND AND SUMMARY OF THE INVENTION

The present invention relates to the heat treatment of finely divided or pulverulent materials in an installation wherein the material is preheated and, if desired, pretreated by the hot exhaust gases coming from the furnace wherein the material is finally treated.

Known installations of this type comprise a source of the material, a furnace for heating the material and having a flue for hot exhaust gases, and a preheating apparatus including a plurality of successive separator stages for the material, such stages usually including cyclones as the preferred separators. A conduit system between the source and the furnace interconnects the source to a first separator stage, the first separator stage to successive separator stages including a last separator stage, and the last separator stage to the furnace. The material passes through the conduit system from the source through the successive separator stages to the furnace, and the hot exhaust gases pass therethrough from the flue to and through the separator stages by respective gas inlets and exhausts in a separator in each stage. The material separated in each but the last separator is carried upstream to a successive separator by the hot gases, and the material separated in the last separator is introduced into the furnace.

In preheating apparatus of this known type, heat exchange between the material and the exhaust gases takes place primarily in the conduits carrying the gases to the separators where the material is carred by the gases in the direction of their flow. But under such conditions, heat exchange is limited to the difference between the temperatures of the material and the gases, wherefore the temperature of the gases at the exhaust end of the preheating apparatus is relatively high, even if several stages are used.

In an effort to utilize the considerable heat energy remaining in the gas exhausted from the preheating apparatus, it has been proposed in cement manufacturing installations, for instance, to use these exhausted gases for drying the source material or as combustion gas for the calcining furnace. This makes it necessary to dimension the drying plant in relation to the temperature of the exhausted gases since the gas volume flow depends on this. Generally speaking, this requires machinery and piping of considerable size, increasing costs and causing operating difficulties.

It is a primary object of the present invention to avoid these disadvantages and to make the most economical use of the heat energy of the exhaust gases from the furnace in the preheating of the material.

This and other objects are accomplished in accordance with this invention by arranging a heat exchanger between the source of the material and the first separator stage of the preheating apparatus in the conduit system so that the material passes through the heat exchanger into the first separator stage in one direction. A conduit connects the gas exhaust of one of the separators of the preheating apparatus to the heat exchanger and passes a fraction of the gas coming from the exhaust to and through the heat exchanger in the opposite direction. In this manner, the material is heated intensely in the heat exchanger by the countercurrently flowing gas carried by the conduit before it enters the preheating apparatus, and the intense heat exchange considerably lowers the temperature of the gas so that it may be exhausted from the heat exchanger at a relatively low temperature. The other fraction of the gas coming from the exhaust is successively passed to the separator stages disposed downstream of the exhaust, in the direction of the gas flow.

With such an arrangement, it is possible to regulate the output and the temperature of the gases being exhausted from the preheating apparatus, and thus to adapt these parameters to the needs of the installations making use of these exhaust gases. Furthermore, the countercurrently operating heat exchanger makes most efficient use of the heat energy of the gases exhausted from the furnace, which is almost fully utilized in the heat exchanger.

BRIEF DESCRIPTION OF THE DRAWING

The above and other objects, advantages and features of the present invention will become more apparent in the following detailed description of certain now preferred embodiments thereof, taken in conjunction with the accompanying drawing wherein.

DETAILED DESCRIPTION

Figure 1:
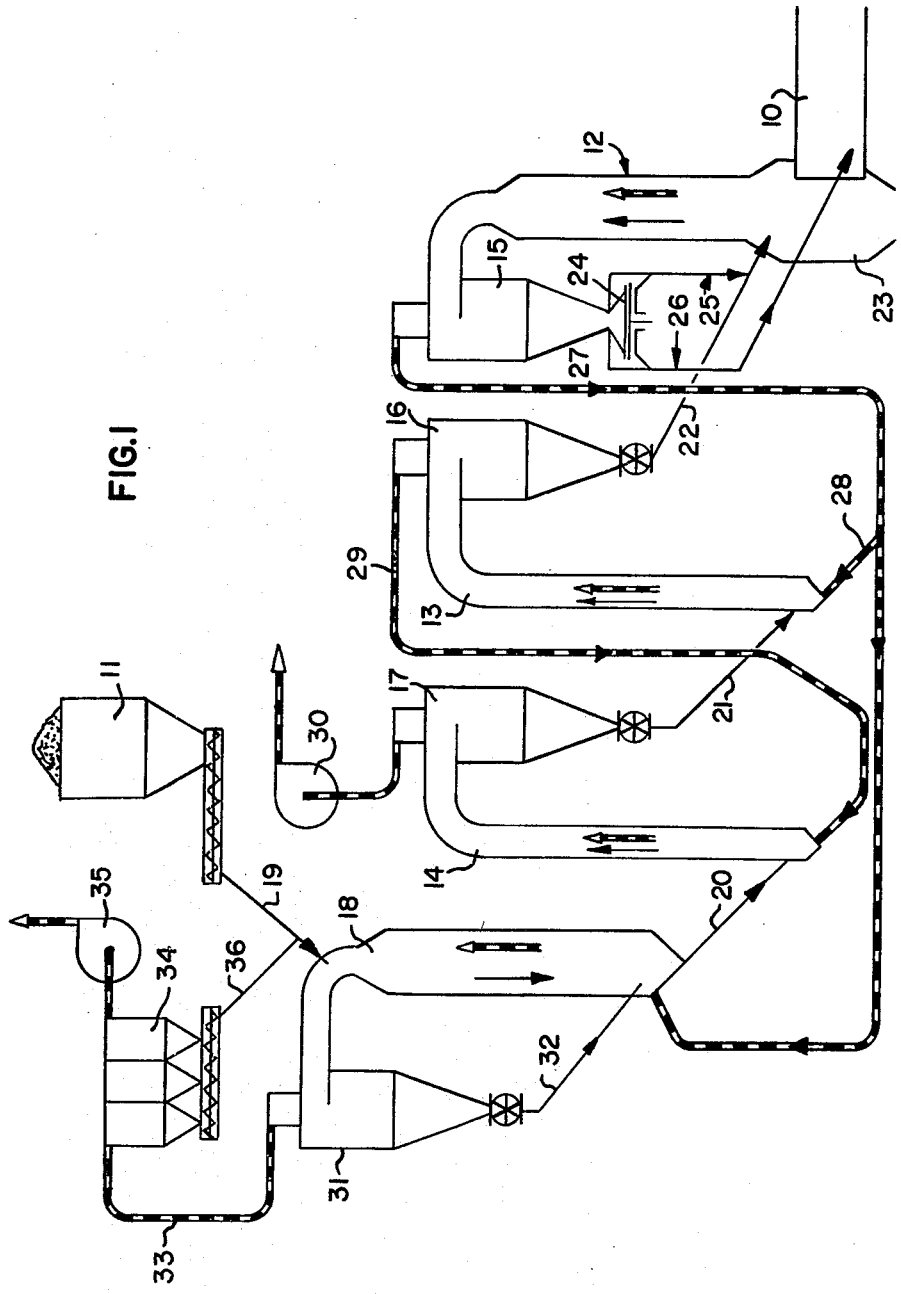
FIG. 1 is a schematic view of one embodiment of the installation according to this invention.

Referring now to the drawing and first to FIG. 1, there is shown a furnace 10, which may be a rotating kiln useful in the production of cement, for example, a hopper 11 constituting a source of finely divided or pulverulent material, and a preheating apparatus for the material. The preheating apparatus includes a plurality of successive separators for the material, the illustrated apparatus consisting of three successive stages each constituted by a cyclone separator and a vertical conduit leading to its inlet. The last separator stage consists of conduit 12 and cyclone 15, the succeeding stage consists of conduit 13 and cyclone 16, and the first stage consists of conduit 14 and cyclone 17.

A heat exchanger 18 is arranged between the hopper 11 and the first separator stage 14, 17, the heat exchanger receiving the material from the source through conduit 19 and delivering it to conduit 14 of the first separator stage through conduit 20. The material is separated from the gas in cyclone 17 whence it is delivered through conduit 21 into conduit 13 of the next succeeding stage, being again separated there in cyclone 16 whence it is delivered through conduit 22 into conduit 12 of the last stage.

In this manner there is provided a conduit system between the source of the material and the furnace, the conduit system interconnecting the source to the first separator, the first separator to the successive separators and the last of the successive separators to the furnace, the material passing in the direction of the solid arrows through the conduit system from the source through the successive separators to the furnace.

Conduit 12 of the last separator stage is attached to the flue 23 of furnace 10 and carries the hot exhaust gases from the furnace to the gas inlet of cyclone 15. The finely divided material is separated from the gas in the cyclone, and the separated material descends by gravity into a known type of distributor 24 at the bottom of cyclone 15, where it is divided into two streams, one stream being passed through branch conduit 25 back into the flue and from there into conduit 12, while the other stream is passed through branch conduit 26 directly into the furnace 10.

On the other hand, the gas exhaust of cyclone 15 is connected by conduit 27 to heat exchanger 18 a branch conduit 28 connecting the conduit 27 to conduit 13 of the next downstream separator stage. In this manner, a fraction of the gas coming from the exhaust of the last separator is passed through conduit 27 to the heat exchange tower 18 where it flows upwardly in the opposite direction to the flow of the finely divided material which descends therein by gravity, the gas flow being indicated by the arrows in broken lines. Thus, the material is heated in heat exchanger 18 by the hot gas coming directly from the furnace 10 before it enters the preheating apparatus.

The branch conduit 28 delivers the other fraction of the gas coming from the furnace to conduit 13 whence it enters cyclone 16 of the next downstream separator stage. The gas exhaust of cyclone 16 is connected by branch conduit 29 to conduit 14 of the first separator stage downstream in the direction of the gas flow. Thus, the additional conduit means constituted by branch conduits 28 and 29 passes a fraction of the gas to the separator stages disposed downstream of the exhaust of separator stage 12, 15, in the direction of the gas flow. This fraction of gas is removed from the first separator stage by an exhaust fan 30.

Any finely divided material carried by the countercurrently flowing gas stream in heat exchanger 18 to the top of the heat exchanger is passed into cyclone 31 where the material is separated from the gas and returned by conduit 32 to the bottom of the heat exchanger. Remaining material carried by the upwardly flowing gas stream is removed through the exhaust of cyclone 31 and passes through conduit 33 into a dust separator 34. The gas is exhausted through fan 35 while the dust is returned from separator 34 through line 36 into conduit 19.

The operation of the installation will be evident from the above description of its structure and will be summarized hereinbelow.

Finely divided material coming from hopper 11 and dust separator 34 enter the top of the heat exchanger tower 18 and descend by gravity while the hot exhaust gas coming from the furnace 10 through conduits 12 and 28 flow countercurrently upwardly through the tower, thus permitting intense heat exchange of the cold material with the hot gas. Therefore, the gas leaves the tower at a low temperature, material carried thereby being separated in cyclone 31 and being returned to the heat exchange tower at its bottom, any remaining material going through dust separator 34 and then being returned to delivery conduit 19.

The heated material enters the first separator stage of the preheating apparatus at the bottom of conduit 20 and is entrained upwardly by the hot gas stream coming from conduit 29, being passed through this stage to the next succeeding stage where it is entrained in conduit 13 by the hot gas stream coming from conduit 28. It is separated from the gas in the separator of each stage, and delivered to the furnace from the bottom of the separator in the last stage. By dividing the material at the bottom of separator 15 into two streams and recycling one portion into conduit 12, further reheating is possible and, if desired, the material may be subjected to an additional treatment in conduit 12, such as decarbonization. However, this latter feature is not required in all instances and, if desired, the distributor 24 may be omitted and all of the separated material may be delivered directly from the last stage to the furnace.

The gas removed by exhaust fan 30 may be directed, if desired, to a drying installation for the material, to the furnace, or to any other apparatus requiring a supply of warm gas.

The amount of the gas fraction directed into the preheating apparatus by conduit 28, as well as the number of separator stages, depend primarily on the heat requirements for the material to be treated.

Figure 2:
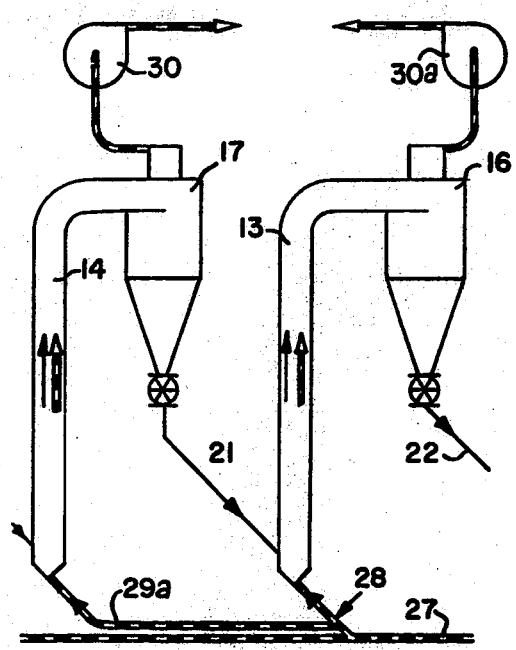
FIG. 2 is a similar partial view showing a modification thereof.

The modification of the installation shown in the partial view of FIG. 2 is identical with that of FIG. 1 in all respects, except for the delivery of the hot gas to the preheating apparatus. To avoid redundancy, the same reference numerals in FIG. 2 designate like parts operating in a like manner as in FIG. 1, the portion of the installation not being shown in FIG. 2 also being identical with that of FIG. 1.

In this modification, the first and second stages of the preheating apparatus are arranged in parallel, instead of in series, as in FIG. 1. Thus, the additional conduit means receiving a fraction of the gas coming through conduit 27 consists of branch conduits 28 and 29a which divide the received gas fraction and passes each divided gas fraction to successive separator stages disposed downstream of the exhaust of the last separator, from which the hot gas comes, in the direction of the gas flow. Branch conduit 28 delivers one part of the received gas fraction to the bottom of conduit 13 and branch conduit 29a deliver the other part of the received gas fraction to the bottom of conduit 14. The gas is removed from cyclone 16 by an exhaust fan 30a similar to exhaust fan 30 whose function has been described in connection with FIG. 1.

If the reaction or treatment in furnace 10 is exothermic or if it is desirable further to heat the exhaust gases entering conduit 12, a burner may be arranged at the bottom of this conduit. It will be equally obvious to those skilled in the art that a number of stages different from three may be used in the preheating apparatus, and that the gas delivered to the heat exchanger may be removed from a separator stage other than the last one. Furthermore, while cyclone separators have been described herein, any other suitable type of separator may be used.

This type of installation is useful in all cases where finely divided or pulverulent material is to be heat-treated, the field of application of the present invention including the calcination of comminuted mineral materials, the manufacture of lime, cement, and the like.

While this invention has been described herein in connection with certain preferred embodiments, it will be obvious that many variations and modifications may occur to those skilled in the art, particularly after benefiting from the present teaching, without departing from the spirit and scope of the invention.

I claim:

1. In an installation for the heat treatment of finely divided or pulverulent material, comprising a source of said material, a furnace for heating said material and having a flue for hot exhaust gases, a preheating apparatus including a plurality of successive separator stages for said material, and a conduit system between the source and the furnace, the conduit system interconnecting the source to a first one of said separator stages, the first separator stage to the successive separator stages including a last separator stage, and the last separator stage to the furnace, the material passing through the conduit system from the source through the successive separator stages to the furnace, and the hot exhaust gases passing therethrough from the flue to and through the separator stages by respective gas inlets and exhausts in a separator of each stage, the material separated in each but the last separator being carried upstream to a successive one of the separators by the hot gases, and the material separated in the last separator being introduced into the furnace, the improvement comprising (1) a heat exchanger arranged between the source and the first separator stage in said conduit system, the material passing through the heat exchanger into the first separator stage in one direction, and (2) a conduit connecting the gas exhaust of one of said separators to the heat exchanger, said conduit passing a fraction of the gas coming from said exhaust to and through the heat exchanger in the opposite direction whereby the material is heated in the heat exchanger by gas carried by said conduit before it enters the pre-heating apparatus.

2. In the installation of claim 1, the heat exchanger being a tower through which the material descends by gravity while the countercurrently flowing gas rises.

3. In the installation of claim 1, the one separator connected to the heat exchanger being the last separator.

4. In the installation of claim 1, additional conduit means passing the other fraction of the gas coming from said exhaust of said one separator successively to the separator stages disposed downstream of said exhaust, in the direction of the gas flow.

5. In the installation of claim 1, additional conduit means receiving the other fraction of the gas coming from said exhaust of said one separator, dividing the received gas fraction and passing each divided gas fraction to successive ones of the separator stages disposed downstream of said exhaust, in the direction of the gas flow.

References Cited

UNITED STATES PATENTS

| | | | |
|---|---|---|---|
| 3,203,681 | 8/1965 | Rosa et al. | 263—53 |
| 3,330,046 | 7/1967 | Albertus | 263—32 X |

JOHN J. CAMBY, Primary Examiner